Patented July 29, 1924.

1,503,113

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER WITH CONDENSATION PRODUCTS OF AMMONIA AND ALDEHYDES AS ACCELERATORS.

No Drawing.        Application filed May 15, 1922.   Serial No. 561,021.

*To all whom it may concern:*

Be it known that I, SIDNEY M. CADWELL, a citizen of the United States, residing in Leonia, county of Bergen, State of New Jersey, have invented certain new and useful Improvements in Processes for Vulcanizing Rubber with Condensation Products of Ammonia and Aldehydes as Accelerators, of which the following is a full, clear, and exact description.

This invention relates to vulcanization of rubber by which term as herein employed is included also balata and gutta percha and rubber substitutes. It is more particularly directed to the vulcanization of rubber employing ammonia and open chain aldehydes and similar substances; and the products obtained therefrom.

This application is a continuation in part of my copending application Serial No. 473,345, filed May 28, 1921, Patent No. 1,417,970.

In the British patent to Peachey, No. 7370 of 1914 the use of acetaldehyde ammonia is set forth, but this accelerator is unstable and poisonous. It also imparts a color to vulcanized rubber and being crystalline is not easily incorporated therewith to form a homogeneous mass. Acetaldehyde ammonia is not a stable compound. Its physical characteristics as well as its strength as an accelerator varies with the time which it has been stored, and its strength as an accelerator is of a relatively low order of magnitude.

It is accordingly an object of this invention to provide a process for vulcanization employing a series of compounds as accelerators which shall include non-poisonous stable materials of the type mentioned; materials which may be used in white or light colored rubber without imparting an undesirable color thereto; which may be readily incorporated with the rubber to form a homogeneous mass; which shall be more active than the substance heretofore known of this type; which shall be substantially free from pre-vulcanization and which may be made from relatively inexpensive materials. Another object of the invention is to provide a vulcanized rubber having good aging properties, freedom from poisonous qualities and which shall have other desirable physical characteristics.

The invention accordingly consists in a process of treating rubber or similar materials which comprises combining the rubber with a vulcanizing agent and a reaction product of an open carbon chain aldehyde having more than two and less than eight carbon atoms in the chain and ammonia, and vulcanizing the rubber. The invention also includes the products of such process.

In its preferred embodiment 100 parts of rubber, 10 parts of zinc oxide, 3 parts of sulphur and 0.5 parts of the condensation product of ammonia and heptaldehyde are mixed together by milling on rolls in the usual manner and vulcanization is accomplished by heating in a mold under 40 lbs. steam pressure for 60 minutes. The time of vulcanization will vary with the thickness of the rubber article undergoing vulcanization. In the examples given the thickness of the materials is generally $\frac{1}{16}''$.

The reaction product of ammonia and heptaldehyde may be prepared by mixing equal molecular weights of ammonia, as aqua ammonia and heptaldehyde, and heating to 130° C.

Materials having properties similar to that of the condensation product of ammonia and heptaldehyde are as follows: propionaldehyde, ammonia, cinnamylaldehyde ammonia, iso valeraldehyde ammonia.

It will be observed that the accelerators except the known accelerator acetaldehyde ammonia listed above include an open carbon chain aldehyde having more than two carbon atoms combined with ammonia.

Processes for employing these materials are substantially identical with those already set forth, that is a typical process consists in mixing 100 parts of rubber, 10 parts of zinc oxide, 3 parts of sulphur and 0.5 parts of the reaction product of the aldehyde and ammonia, and vulcanizing them at 40 lbs. steam pressure for 60 minutes. The proportions mentioned may be varied as desired to produce various compounds. The quantity of the reaction product employed may vary from 0.2–1 part or more. 0.2 parts is ordinarily used when employing heptaldehyde ammonia as indicated.

Although in the examples given above, the aldehyde ammonia compounds are indicated as being milled while in the form of this compound with rubber, it will be obvious that the invention set forth in my copending application Serial No. 441,691, filed February 1, 1921 may be followed and that the ingredients making up the aldehyde ammonia condensation product may be added separately. For example the following procedure may be carried out: 100 parts of rubber, 10 parts of zinc oxide, 3 parts of sulphur and 3 parts of heptaldehyde may be combined by milling. The mixture may then be exposed to ammonia for 60 minutes at 50° C. Or if desired the ammonia may be brought into contact with the mixture at ordinary temperature (70° F.) and allowed to remain in contact therewith for six hours. The rubber is subsequently vulcanized in the usual manner for 60 minutes under 40 lbs. steam pressure.

In accordance with tensile strength tests, it has been observed that the preferred member of this group is heptaldehyde ammonia. In its use in rubber this material also has other highly desirable properties. It is substantially non-toxic. It does not impart a color to rubber with which it is vulcanized. It is an oil and may be readily incorporated in the rubber to form a homogeneous mixture. It exhibits substantially no tendency to prevulcanize upon milling at the ordinary milling temperatures. Heptaldehyde ammonia is substantially stable and does not decompose upon being stored under ordinary conditions. When compared with acetaldehyde ammonia it is approximately four times as powerful as acetaldehyde ammonia. The various members in the table above other than heptaldehyde ammonia (and excepting acetaldehyde ammonia) have one or more of the valuable properties ascribed to heptaldehyde ammonia and are accordingly valuable.

It is pointed out that in the condensates of aldehydes with ammonia, more than one reaction product may be formed and accelerating action may be due in part at least to one or more of these products. It will be understood accordingly that the appended claims are intended to cover reaction products containing either the simple condensation of aldehyde and ammonia or one of a different character or both.

It will be observed that the products listed above are in general combinations of ammonia with straight chain aldehydes one of which in the case of cinnamylaldehyde has a benzene ring linked to the chain and having an aldehyde group linked to the carbon atoms of the straight chain.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process of treating rubber which comprises combining the rubber with a vulcanizing agent and a reaction product of an open carbon chain aldehyde having more than two carbon atoms and ammonia, and vulcanizing the rubber.

2. A process of treating rubber which comprises combining the rubber with a vulcanizing agent and a reaction product of an aldehyde having seven carbon atoms in a straight hydrocarbon chain and ammonia, and vulcanizing the rubber.

3. A process of treating rubber which comprises combining the rubber with a vulcanizing agent and the reaction product of heptaldehyde and ammonia, and vulcanizing the rubber.

4. A process of treating rubber which comprises combining the rubber with a vulcanizing agent, a bivalent metal and the reaction product of heptaldehyde and ammonia, and vulcanizing the rubber.

5. A process of treating rubber which comprises combining the rubber with a bivalent metal, sulphur, and the reaction product of ammonia and heptaldehyde, and vulcanizing the rubber.

6. A process of treating rubber which comprises combining the rubber with zinc in combination, sulphur and heptaldehyde ammonia, and vulcanizing the rubber.

7. A vulcanized rubber derived from rubber combined with a vulcanizing agent and a reaction product of an open carbon chain aldehyde having more than two carbon atoms and ammonia.

8. A vulcanized rubber derived from rubber combined with a vulcanizing agent and a reaction product of an aldehyde having seven carbon atoms in a straight hydrocarbon chain and ammonia.

9. A vulcanized rubber derived from rubber combined with a vulcanizing agent and the reaction product of heptaldehyde and ammonia.

10. A vulcanized rubber derived from rubber combined with a vulcanizing agent, a bivalent metal and the reaction product of heptaldehyde and ammonia.

11. A vulcanized rubber derived from rubber combined with a bivalent metal, sulphur, and the reaction product of ammonia and heptaldehyde.

12. A vulcanized rubber derived from rubber combined with zinc in combination, sulphur and heptaldehyde ammonia.

Signed at New York, New York, this 13th day of May, 1922.

SIDNEY M. CADWELL.